Figure 1:
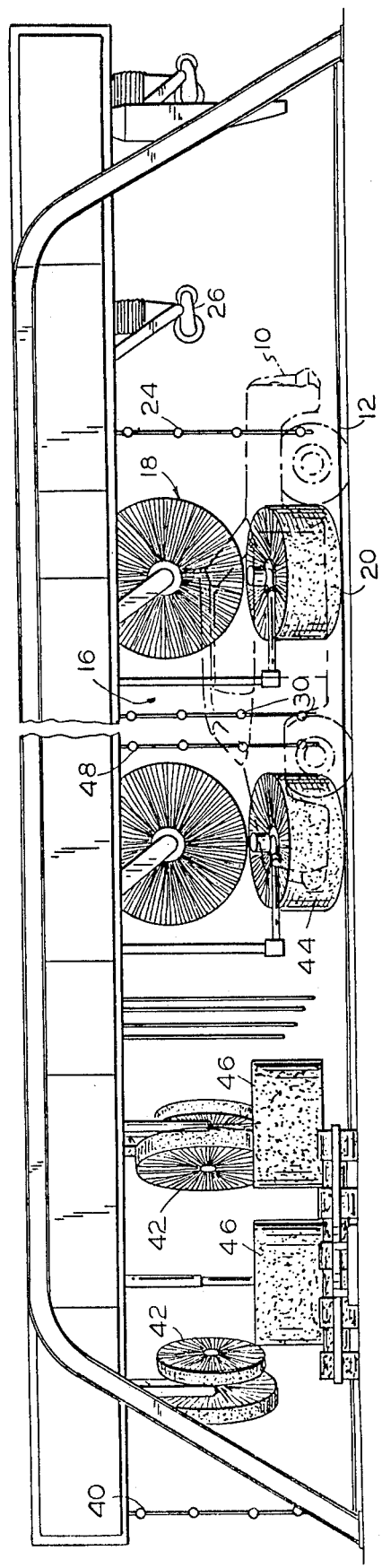

United States Patent [19]

Hanna

[11] 4,051,806
[45] Oct. 4, 1977

[54] APPARATUS FOR WAXING CARS

[76] Inventor: Daniel C. Hanna, 1133 SW. Rivington Drive, Portland, Oreg. 97201

[21] Appl. No.: 738,738

[22] Filed: Nov. 4, 1976

Related U.S. Application Data

[62] Division of Ser. No. 572,093, April 28, 1975, Pat. No. 4,015,032.

[51] Int. Cl.² ............................................. B05B 7/26
[52] U.S. Cl. ........................................ 118/63; 118/73; 118/115; 118/314
[58] Field of Search .............. 118/2, 7, 8, 110–115, 118/63, 73, 58, 61, 323, 313, 315, 316, 314; 15/DIG. 2; 427/334, 348, 416, 421, 368; 239/53 AB

[56] References Cited

U.S. PATENT DOCUMENTS

| | | | |
|---|---|---|---|
| 3,061,457 | 10/1962 | Brown | 427/368 |
| 3,447,505 | 6/1969 | Wagner | 118/73 X |
| 3,537,423 | 11/1970 | Burden | 118/2 |
| 3,886,893 | 6/1975 | Takeuchi | 118/316 X |
| 4,006,703 | 2/1977 | Smith | 118/2 |

Primary Examiner—Morris Kaplan
Attorney, Agent, or Firm—Klarquist, Sparkman, Campbell, Leigh, Hall & Whinston

[57] ABSTRACT

Brushes and sprays wash and rinse cars and foam wax then is sprayed on the cars and is buffed by a top brush and side brushes, immediately after which a sealing wax in an aqueous solution is sprayed onto the cars. Then the cars are passed through a blower, which removes the excess aqueous solution.

4 Claims, 2 Drawing Figures

APPARATUS FOR WAXING CARS

This is a division, of application Ser. No. 572,093 filed Apr. 28, 1975, now U.S. Pat. No. 4,015,032.

DESCRIPTION

This invention relates to improved apparatus for waxing cars, and has for an object thereof the provision of new and improved methods of and apparatus for waxing cars.

Another object of the invention is to provide an apparatus for applying a foam wax to a car and polishing the wax while still wet.

A further object of the invention is to provide an apparatus for applying an aqueous foam wax to a car, polishing the wax and then applying a hard, sealing wax of the self-polishing type to the car.

Figure 2:
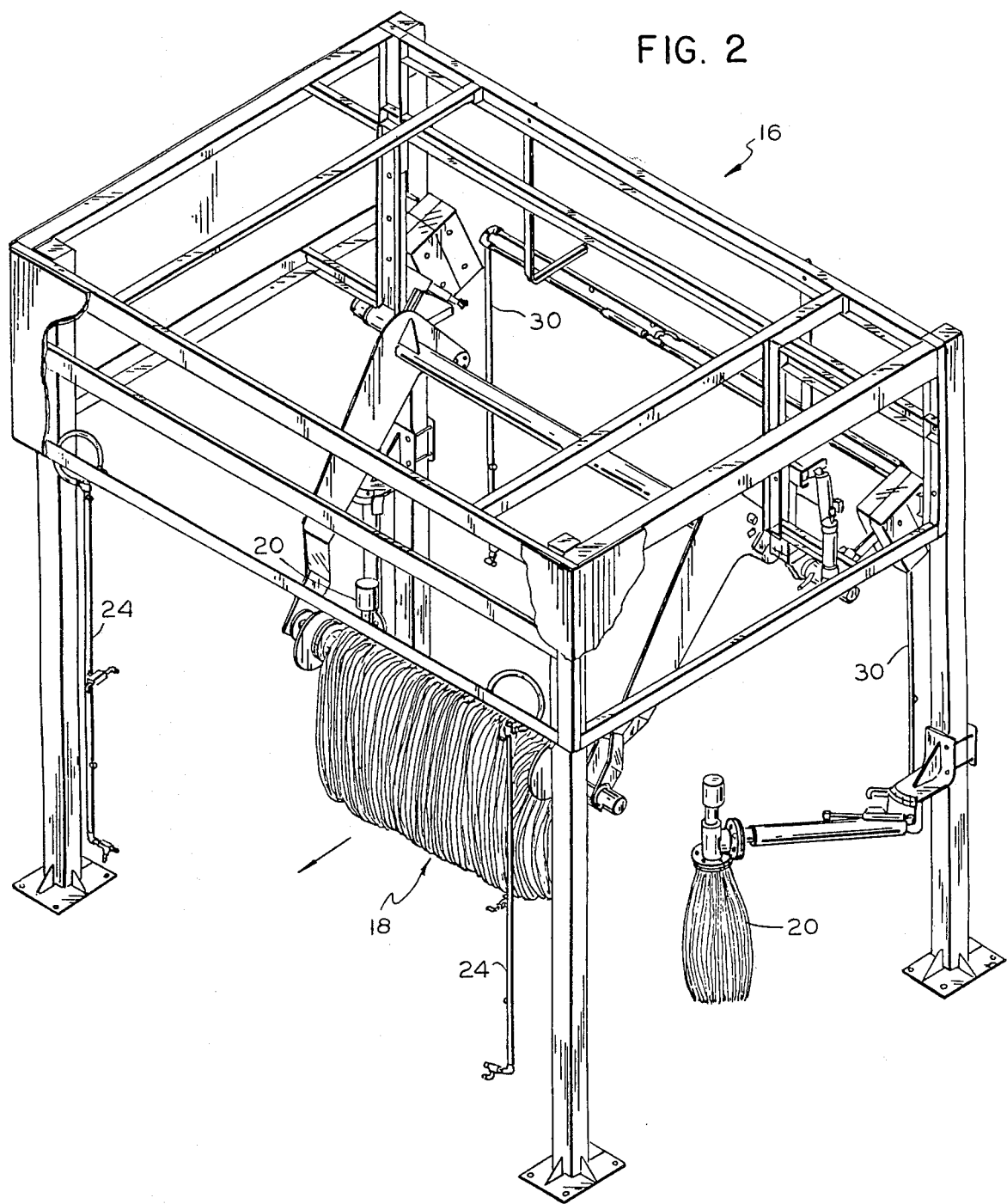

In the drawings:

FIG. 1 is a side elevation view of an apparatus forming one embodiment of the invention and adapted to perform a method forming one embodiment of the invention; and FIG. 2 is an enlarged, perspective view of a portion of the apparatus of FIG. 1.

Referring now in detail to the drawings, there is shown therein an apparatus forming one embodiment of the invention and adapted to effect a method forming one embodiment of the invention. Cars 10 are advanced continuously by a conveyor 12 past known soaping, brushing and rinsing apparatus to and through a foam wax applicator 16, a top buffing brush 18 and side buffing brushes 20, a rinsing and sealing wax applicator 24 and a drying blower 26. The cars are cleaned by the apparatus 14 and are wet as they enter the foam wax applicator 16 which directs streams of foamed wax onto the front, rear, top and side surfaces of each car to substantially completely cover these surfaces with an aqueous foamed wax which adheres to these surfaces. The car with the foam wax thereon then passes through the buffing brushes which brush the waxed surfaces to polish the wax while wet and remove excess foam wax from the car. After this buffing or polishing, streams of an aqueous rinsing and sealing wax solution are applied to the foam waxed surfaces, and the sealing wax is deposited onto the foam wax on the surfaces to form a somewhat thick, highly glossed, hard, durable wax coating. Water still on the surfaces is blown off by the dryer.

The foam wax and its application may be one of the foam waxes and methods disclosed and claimed in copending application, Ser. No. 432,815, filed Jan. 14, 1974, now abandoned, by Judson L. Smith for "FOAMED WAX PROCEDURE". The foam wax is a group of bubbles separated from one another by thin films, the aggregation having a finite static life. The liquid waxes which may be used for the foam wax of this invention, are those traditionally used in automatic car washes. These go under a variety of trade names, some of which are "Hot Carnauba Wax"; "Turtle Wax"; "Blue Coral", and many others. However, in general, waxes are defined as a substance having the properties of (a) crystalline to micro-crystalline structure, (b) the capacity to acquire gloss when rubbed, (c) the capacity to produce paste or jells with suitable solids or when mixed with other waxes, (d) low viscosity at just below the melting point, (e) low solubility in solvents for fats at room temperatures. Waxes are derived from various sources such as minerals, vegetables and synthetic material. However, the most common waxes used in car waxes are vegetable waxes, and, more particularly, carnauba waxes which are formed from complex alcohols, hydrocarbons, and resins. Different waxes will react differently to the foaming operation of this process. Therefore, the actual wax used will be a matter of personal choice and preference.

Specific examples of wax and foaming agents used therewith are those marketed by Sun Ray Chemical Corp., 115 East Jackson, Phoenix, Ariz., under Sun Glow, Part No. 0024 for the wax, and Part No. 0023 for the foaming agent. In a preferred embodiment of this invention, these are used in proportions of one part of wax, one part of foaming agent, to fifty parts of water. It is believed that under some circumstances, the foaming agent can be varied from one-tenth of a part to two parts, per part of wax, per fifty parts of water. The proportion of water used, can be decreased from fifty parts, but the performance is not significantly improved, if improved at all, and the cost is significantly increased.

The foam wax applicator may include a pressurized tank with an aqueous mixture of wax, water and foaming agent therein, or it may include an unpressurized tank and an ejector apparatus employing the "Dema" type ejector, mixes wax with water and adds compressed air in a foaming chamber. Also, the nozzles 30 may be foaming nozzles. The foam wax when formed and applied to the automobile or other surface is then stable for a finite period of time, generally slightly less than ten minutes.

The sealing wax is self-polishing, hard and durable, and is of the type commonly used in car washes wherein it is applied in an aqueous solution and is self-polishing. It is often referred to as a "hot wax". Specific examples of the sealing wax are CW-450 wax concentrate sold by Mt. Hood Chemical Corporation of 4444 N.W. Yeon Ave., Portland, Ore. 97210, and the self-polishing wax concentrate sold by Keystone Corporation of Kansas City, Mo. These wax concentrates are mixed with water in a ratio of about one-quarter to two ounces of the wax concentrate to one gallon of water. Other waxes and solutions which can be used are those disclosed in U.S. Pat. No. Re. 27,890 and U.S. Pat. Nos. 3,222,201; 3,222,213 and 2,626,870. The aqueous solution preferably is hot, being of a temperature of 120° F. or hotter.

By applying the aqueous sealing wax to the car while the foam wax is still wet, oxidation of the foam wax is minimized, and the sealing wax may be applied to the nip of the brushes 18 and 20, nozzles 30 directing the streams of sealing rinse water with wax therein onto the car.

The apparatus 14 includes soaping nozzles 40, a top brush 42, side brushes 44, wraparound brushes 46 and water rinsing nozzles 48. Each car is thoroughly washed and rinsed by the apparatus 14 so that it comes to the foam wax applicator 16 clean and wet. The nozzles 30 direct streams of aqueous foaming wax onto the top surfaces of the car and onto the sides of the car below the side windows to foam a layer of foamed wax on these surfaces. The applicator 16 and buffing brushes 18 and 20 are actuated by the car striking position switches, and the brushes 18 and 20 are rotated and are urged toward the car into brushing engagement with the still wet waxed surfaces and buff the wax onto these surfaces. The buffed surfaces are still wet and unoxidized when the rinse water containing the sealing wax is applied to the top and side surfaces of the car. After the car leaves the brushes 18 and 20, the continuously operated dryer nozzles 26 blow off excess water left on the car. The dryer nozzles are directed somewhat rearwardly, and would blow off the foam wax as it is applied if the brushes 18 and 20 were not present. However, the brushes 18 and 20 block the flow of air therepast, and the streams of foam wax being applied and the foam wax layer on the car are not disturbed by the dryer air.

What is claimed is:

1. In an apparatus for waxing cars,
   foam wax nozzle means for spraying a foamed mixture of wax and water onto a car to form a layer of foam on the car,
   means for brushing the foam layer to polish the wax onto the car and remove most of the water therefrom,
   second nozzle means for directing streams of a second mixture of self-polishing sealing wax and water onto the polished wax coating on the car, and
   means for blowing air onto the car to remove excess of the second mixture from the car, the brushing means being interposed between the foam wax nozzle means and the blower means so that the air from the blower means does not blow the foam off the car.

2. The apparatus of claim 1 including arch means supporting the foam wax nozzle means, the brushing means and the second nozzle means.

3. The apparatus of claim 2 including car washing and brushing means positioned in advance of the arch means, and blower means positioned beyond the arch means.

4. In a car washing and and waxing apparatus,
   conveyor means for advancing cars one after another along a predetermined path,
   soaping means for applying soapy water to the cars at one point along the path,
   brushing means subsequent to the soaping means for brushing the front, rear, sides and top of the cars,
   rinse means for applying rinsing water to the cars after they have been brushed,
   foam waxing means subsequent to the rinse means for applying a layer of foamed mixture of wax and water to the cars after they have been rinsed,
   buffing means for buffing the layer of foamed mixture of wax and water,
   means for applying a hot aqueous sealing wax mixture to the buffed car,
   and blower means for blowing off excess of the hot aqueous wax mixture and disposed so that the buffing means prevents the blower from blowing the foamed mixture off the car.

* * * * *